Oct. 16, 1956      M. H. FRANK      2,766,634
TIMING CHAIN BUMPER
Filed March 26, 1954
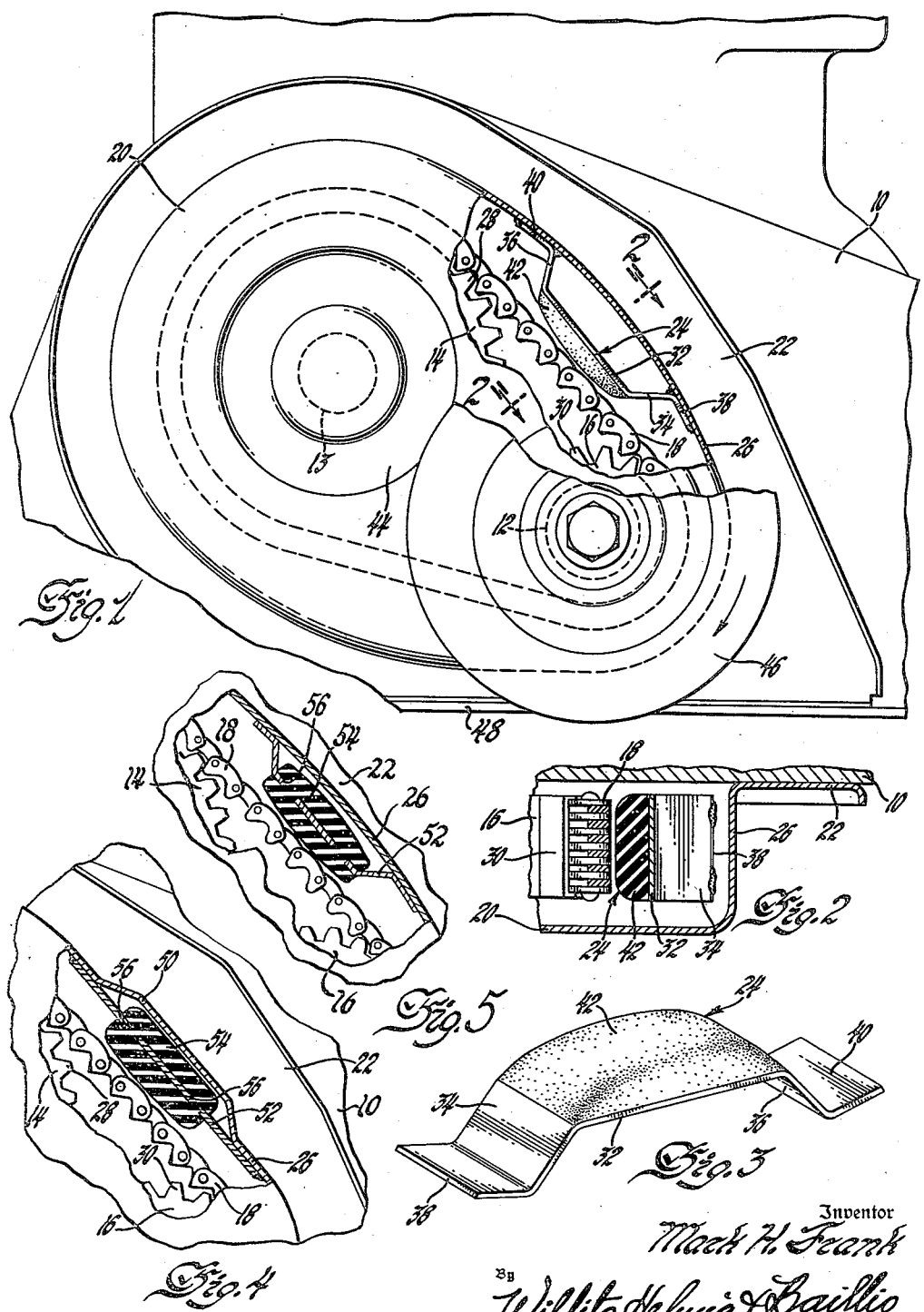
Inventor
Mack H. Frank
By Willits, Helwig & Baillio
Attorneys United States Patent Office 2,766,634
Patented Oct. 16, 1956

2,766,634
TIMING CHAIN BUMPER

Mark H. Frank, Birmingham, Mich., assignor to General Motors Corporation, Detroit, Mich., a corporation of Delaware Application March 26, 1954, Serial No. 418,985

8 Claims. (Cl. 74—240)

This invention relates to chain bumpers and particularly to a bumper construction for quieting the operation of chain-type timing mechanisms and for damping torsional vibration of camshafts of internal combustion engines. This is a continuation-in-part application of my co-pending patent application Serial Number 148,612, filed March 9, 1950, and now abandoned.

The periodic impulses on a timing chain due to the pulsating load on the camshaft causes a rapid undulation or whipping action in a timing chain which has become stretched, resulting in excessive vibration and objectionable noises due to contact between the loose chain and the sprocket teeth. A principal object of the invention is to reduce this vibration due to chain looseness by providing a bumper installed adjacent to the tension or drive portion of the chain.

This bumper comprises a metal bracket carrying a resilient chain-engaging member which controls whipping of the chain and minimizes the noise resulting from the pulsating chain and sprocket contact. Use of the bumper, inasmuch as it reduces the camshaft sprocket vibration caused by the loose chain, also dampens the torsional vibration of the camshaft, this latter effect otherwise often being reflected in erratic ignition timing adversely affecting the operation of the engine.

For simplicity of construction, the bracket may be welded to the housing wall, and the chain-engaging member, preferably synthetic rubber, vulcanized to the inwardly facing surface of the bracket, resulting also in a very inexpensive design.

Other objects and advantages of the invention will more fully appear from the following description of the preferred embodiment of the invention illustrated in the accompanying drawing, in which:

Figure 1 is a front elevational view, partly broken away, of an internal combustion engine timing chain mechanism provided with a vibration damping bumper embodying the invention;

Figure 2 is an enlarged sectional view along the line 2—2 of Figure 1, showing the position of the bumper relative to the chain under nonoperating conditions and the details of construction of these members;

Figure 3 is a perspective view of the timing chain bumper shown in Figures 1 and 2;

Figure 4 is a fragmentary front elevational view, with parts broken away and in section, of a modification of the vibration damping device embodying the invention; and Figure 5 is a fragmentary front elevational view, with parts broken away and in section, of another modification of the vibration damping device embodying the invention.

Referring to the drawing, the forward wall 10 of the engine block of an internal combustion engine supports a crankshaft 12 and a camshaft 13. Trained about the camshaft timing sprocket 14 and the crankshaft timing sprocket 16 is the timing chain 18. The direction of rotation of the camshaft and crankshaft sprockets is indicated by the arrow in Figure 1. A housing 20 for enclosing and protecting the timing chain and sprocket mechanism is secured to the forward wall 10 of the engine block, preferably by bolts or screws, which are not shown, through flange 22.

A bumper, generally designated by 24, for minimizing vibration in the timing mechanism is secured to the inner surface of the peripheral wall 26 of the housing 20 near the tension portion of the chain. As shown in Figures 1 through 3, where the housing wall is located at a substantial distance from the chain, the bumper 24 preferably comprises a generally U-shaped bracket having a base portion 32 and outwardly projecting legs 34 and 36. The ends of these legs are bent outwardly from the base to form supporting flanges 38 and 40, which may be spot welded to the inner surface of the housing wall 26. A resilient chain-engaging member or pad 42, preferably of synthetic rubber, is secured to the inwardly facing surface of the base 32 of the bracket and is located at a point approximately equidistant from the outer edges of the teeth 28 of the camshaft sprocket 14 and the teeth 30 of the crankshaft sprocket 16. This pad, if rubber, is preferably vulcanized to the bracket. A synthetic rubber pad is advantageous, of course, because it will not be subject to deterioration by the oil with which it necessarily comes into contact.

The embodiment of the invention shown in Figure 4 is particularly adaptable to a construction wherein the supporting surface or housing for the bumper is positioned very close to the tension portion of the chain, leaving no room for the bracket legs, such as legs 34 and 36, to extend outwardly from the chain. Under these circumstances the housing wall 26 may be provided with an outwardly recessed portion 50, as shown in Figure 4, so that the entire bracket 52, including the legs and base portion which supports the resilient pad 54, extends generally parallel with the chain and is secured, preferably by welding, to the inner surface of the adjacent unrecessed portions of the housing wall 26. The pad is shown in Figure 4 as being molded around the bracket or plate 52 and extending through openings 56 in this bracket to more securely fasten the pad to the bracket. If the pad is rubber, it is also preferably vulcanized to the bracket. It is apparent, of course, that if the housing and tension portion of the chain are spaced apart to a sufficient extent, the legs of the bracket 52 may be shaped similar to the bracket legs shown in Figures 1 through 3. If this is done, the housing wall obviously need not be recessed in all instances. This modification of the invention is shown in Figure 5.

A circular boss 44, as shown in Figure 1, may be provided in the forward face of the timing chain housing to stiffen the structure. A crankshaft torsional vibration damping device is represented by 46. The forwardly extending lower flange 48, shown in Figure 1, is of the type designed to be secured to the engine mounting.

During operation the slackened chain 18 strikes the cushioning surface of the bumper, thereby minimizing chain whipping and preventing camshaft sprocket vibration due to looseness between the chain and sprocket teeth, resulting in more quiet operation. This in turn dampens torsional vibration of the camshaft. As best shown in Figures 2 and 3, the resilient pad 42 preferably is provided with rounded edges on its exposed surface to reduce the possibility of the chain tearing the pad.

While the described embodiments of the present invention constitute preferred forms, it is to be understood that other forms might be adopted, all coming within the scope of the following claims.

I claim:

1. In a chain drive, a pair of sprockets, a chain carried by said sprockets, a housing enclosing said chain and sprockets, said housing having a portion of its wall adjacent the tension portion of the chain recessed from said chain, a substantially flat plate bridging said housing recess and having its ends secured to the inner surface of the housing wall, said plate extending generally parallel to the adjacent portion of the chain, and a resilient pad affixed to said plate, a portion of said pad being located between the plate and the chain, and another portion of said pad being on the opposite side of said plate extending into said housing recess.

2. In a chain drive, a supporting member, a plurality of sprockets, an endless chain operably positioned on said sprockets for travel adjacent said supporting member, a bracket member mounted on the supporting member adjacent a tension portion of the chain, said bracket member having a plurality of openings extending therethrough, one of said members being recessed from the other to provide an interjacent offset region, and a synthetic rubber chain-engaging pad secured to said bracket member by being molded through said openings, a portion of said pad being located between the bracket member and the chain and another portion of said pad being located in said offset region on the opposite side of said bracket member between said supporting member and said bracket member.

3. In a chain drive including a supporting member, a plurality of sprockets and a chain carried by said sprockets for travel adjacent said supporting member, a chain bumper construction for reducing chain whipping and sprocket vibration, said bumper construction comprising a bracket member mounted on said supporting member adjacent a tension portion of said chain, one of said members being recessed from the other to provide an interjacent offset region, and a rubber pad molded through an opening in said bracket member and vulcanized to opposite surfaces thereof, a portion of said pad being located between the bracket member and the chain and another portion of said pad being located in said offset region on the opposite side of said bracket member between said supporting member and said bracket member.

4. In a chain drive, a supporting member, a plurality of sprockets, an endless chain operably positioned on said sprockets for travel adjacent said supporting member, a bracket member mounted on the supporting member adjacent a tension portion of the chain, said bracket member being provided with a plurality of openings extending therethrough, one of said members being recessed from the other to provide an interjacent offset region, and a synthetic rubber chain-engaging pad vulcanized to opposite surfaces of the bracket member and extending through said openings, said pad thus being securely mounted on the bracket member for contact with the tension portion of the chain during operation.

5. In a chain drive, a plurality of sprockets, a chain carried by said sprockets, a housing enclosing said chain and sprockets, and a bumper for reducing chain whipping and sprocket vibration comprising a generally U-shaped bracket having a base portion and legs projecting against and secured to the inner surface of a wall of said housing, the base portion of said bracket being provided with an opening formed therein, and a resilient pad of synthetic rubber molded through said opening and extending from either side of said base portion, said pad having its surface opposite said legs projecting into proximity to the tension portion of the chain so as to periodically contact said chain during operation.

6. In an internal combustion egine, the combination with a crankshaft sprocket, a camshaft sprocket, a timing chain carried by said sprockets, and a housing for said parts, of a vibration damping device comprising a generally U-shaped sheet metal bracket having a generally flat base portion and legs projecting against and secured to the inner surface of the peripheral wall of said housing, said base portion being provided with a plurality of openings extending completely therethrough, and a resilient pad formed of a moldable material extending through said openings, said pad projecting from said base portion on one side thereof into proximity to the tension portion of the chain and on the other side thereof into proximity to said peripheral wall, said pad being positioned approximately equidistant from the two sprockets.

7. In an internal combustion engine, the combination with a crankshaft sprocket, a camshaft sprocket, a timing chain carried by said sprockets, and a housing for said parts, of a vibration damping device comprising a generally U-shaped metal bracket having a base and legs projecting from said base against and secured to an inner surface of said housing, said base having a plurality of openings extending therethrough, and a synthetic rubber chain-engaging pad secured to said bracket by being molded through said openings and vulcanized to said base, a portion of said pad being located between the base of the U-shaped bracket and the chain, another portion of said pad being located on the opposite side of said base between said inner surfaces of the housing and said base, said pad being positioned approximately equidistant from the two sprockets and projecting into proximity to the tension portion of the chain.

8. In a chain drive, a supporting member, a plurality of sprockets, a chain carried by said sprockets, a bracket member mounted on the supporting member adjacent a tension portion of the chain, one of said members being recessed from the other to provide an interjacent offset region, and a resilient pad affixed to said bracket member, a portion of said pad being located between the bracket member and the chain and another portion of said pad being located in said offset region on the opposite side of said bracket member between said supporting member and said bracket member.

References Cited in the file of this patent

UNITED STATES PATENTS

| | | |
|---|---|---|
| 1,777,527 | Morse | Oct. 7, 1930 |
| 1,838,164 | Tannewitz | Dec. 29, 1931 |
| 1,988,421 | McCann et al. | Jan. 15, 1935 |
| 2,019,052 | Lord | Oct. 29, 1935 |
| 2,224,648 | Haadem | Dec. 10, 1940 |
| 2,601,789 | Riopelle | July 1, 1952 |

FOREIGN PATENTS

| | | |
|---|---|---|
| 353,334 | Germany | July 26, 1922 |
| 628,803 | Great Britain | Sept. 5, 1949 |